(12) United States Patent
Kim et al.

(10) Patent No.: US 7,875,662 B2
(45) Date of Patent: Jan. 25, 2011

(54) METHOD FOR PREPARING SURFACE-IMPRINTED POLYMER MICROSPHERES HAVING A CORE-SHELL FORM FOR SELECTIVE SEPARATION OF HEAVY METAL IONS

(75) Inventors: Duk Joon Kim, Seoul (KR); Hoang Anh Dam, Gyeonggi-do (KR); Dong Keun Yoo, Gyeongsangbuk-do (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 323 days.

(21) Appl. No.: 12/042,101

(22) Filed: Mar. 4, 2008

(65) Prior Publication Data

US 2008/0221248 A1    Sep. 11, 2008

(30) Foreign Application Priority Data

Mar. 5, 2007   (KR) .................. 10-2007-0021399

(51) Int. Cl.
*C08F 6/24*   (2006.01)
*C08L 83/00*   (2006.01)
*C08K 5/101*   (2006.01)

(52) U.S. Cl. .................. 523/201; 523/202; 523/203; 524/297; 528/480

(58) Field of Classification Search .............. 523/201, 523/202, 203; 524/297; 528/480
See application file for complete search history.

(56) References Cited

U.S. PATENT DOCUMENTS

| | | | |
|---|---|---|---|
| 6,780,323 B2 * | 8/2004 | Murray | 210/638 |
| 6,881,804 B1 | 4/2005 | Sellergren et al. | |
| 2003/0186328 A1 * | 10/2003 | Carter et al. | 435/7.1 |

FOREIGN PATENT DOCUMENTS

| | | |
|---|---|---|
| JP | 2005-320422 | 11/2005 |
| JP | 2006-138656 | 6/2006 |

* cited by examiner

*Primary Examiner*—Tae H Yoon
(74) *Attorney, Agent, or Firm*—Rabin & Berdo, P.C.

(57) ABSTRACT

A method of preparing surface-imprinted microspheres having a core-shell form for selective separation of heavy metal ions, includes reacting a metal salt of a heavy metal with a monomer having at least one group that reacts with the metal salt under conditions effective to prepare a metal ion-containing monomer; mixing the metal ion-containing monomer with a cross-linker monomer and a polymerization initiator in a solvent to provide a mixture; subjecting styrene to dispersion polymerization to provide polystyrene beads that serve as a core; causing absorption of dibutyl phthalate onto the polystyrene beads to provide dibutyl phthalate-containing polystyrene beads; adding the mixture to the dibutyl phthalate-containing polystyrene beads, causing absorption of the metal ion-containing monomer onto the dibutyl phthalate-containing polystyrene beads, and causing polymerization of the absorbed monomer with the cross-linker monomer to provide the surface-imprinted microspheres; and causing removal of the metal ions to provide imprinted sites.

14 Claims, 18 Drawing Sheets

(a)  (b)  (c)

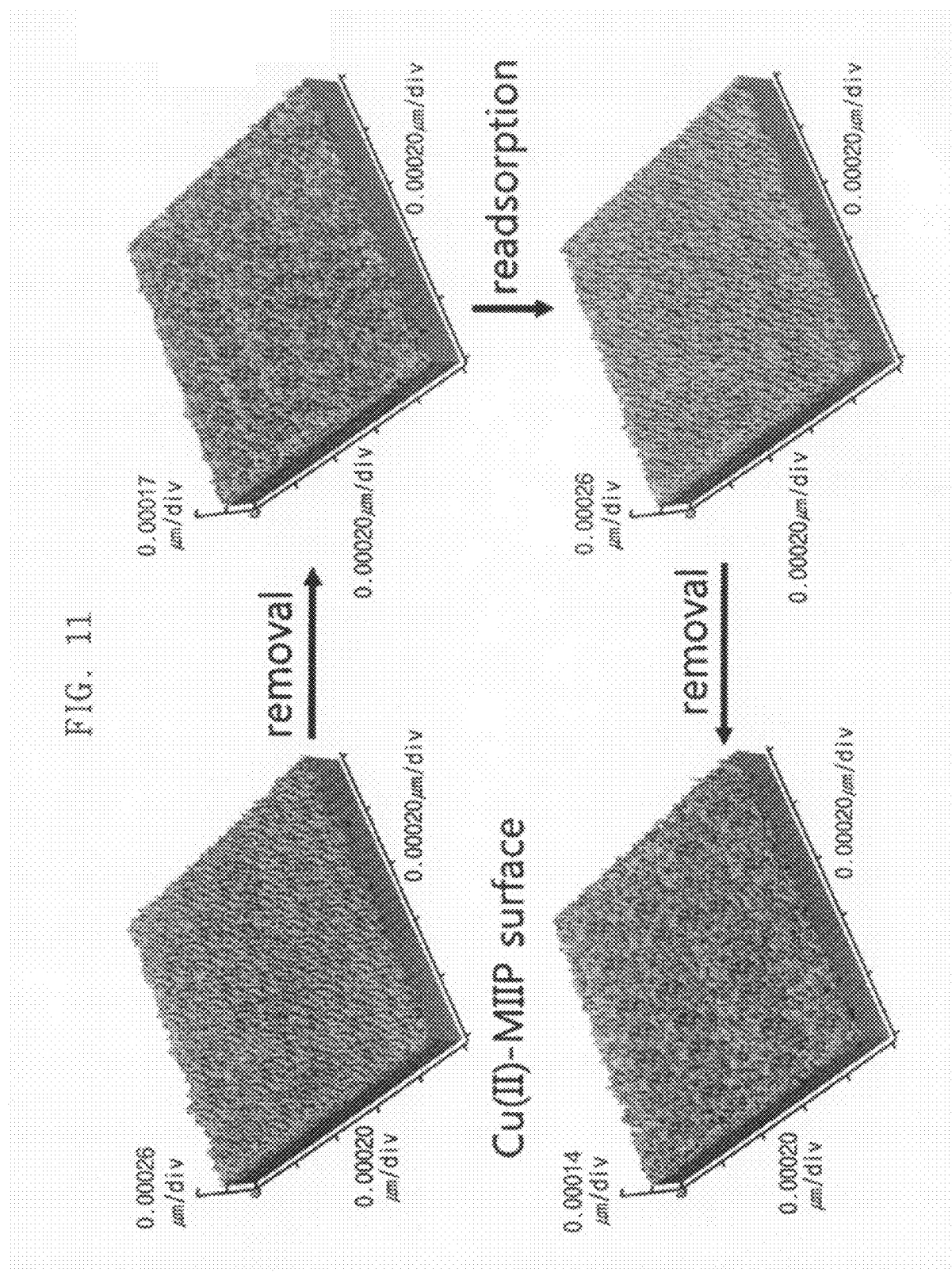

METHOD FOR PREPARING SURFACE-IMPRINTED POLYMER MICROSPHERES HAVING A CORE-SHELL FORM FOR SELECTIVE SEPARATION OF HEAVY METAL IONS

BACKGROUND OF THE INVENTION

1. Field of the Invention

The present invention relates to a method of preparing surface-imprinted polymer microspheres in the form of core-shell for the selective separation of heavy metal ions.

2. Description of the Related Art

Recently, a molecularly imprinted polymer (MIP) or a metal ion imprinted polymer (MIIP), advantageously serving as a separation tool which is environmentally friendly and simplifies the separation process, has been developed. The term "MIP" or "MIIP" refers to a polymer which includes a space having the same form as a template. The space is formed by synthesizing a polymer from a monomer that binds with a template and then removing the template.

Because only a template having the same form as the template space can be inserted therein and a molecule having a stereo-structure different from that of the template cannot be inserted therein, the use of the polymer having the template space enables the separation of other molecules that are different from the template in structure. This is the same theory as Fischer's Lock-and-Key Concept, in which an antibody specifically interacts with a corresponding antigen, or Receptor Theory, in which an enzyme has a specific activity with its counterpart substrate.

The preparation of the MIP or MIIP is described in detail below. For molecular or ion imprinting, a template is dissolved in a porogen and is then mixed with a polymerizable functional monomer having a functional group able to bind with part of the template, thus forming a composite of the template and the functional monomer. Thereafter, in order to maintain the arrangement of the functional monomer bound with the template, a cross-linker, which is an inert monomer, and a polymerization initiator are added in excess amounts, so that polymerization takes place. In this procedure, the porogen for dissolving the template plays an important role in determining the properties of the synthesized polymer. In particular, because a polar porogen dissolves a polar molecule, it may destroy the bonds between the template and functional single molecules.

Actually, with regard to MIP techniques, thorough research into structural designs and preparation methods for molecules having the ability to recognize specific molecules has been continued to date, and has mainly focused on the separation of compounds which are difficult to separate, such as racemic compounds or amino acids. The basic idea of applying the MIP techniques to the selective separation of heavy metal ions is proposed these days. At present, related research is being conducted in some advanced countries including the USA, Japan, and Sweden, and the scope thereof is further widening.

The Mosbach group of Lund University in Sweden has attempted the selective separation of various types of similarly structured compounds through molecular imprinting [Mosbach, K. Trends biochem. 19, 9 (1994)]. Further, the Murray group of Maryland University in the USA has synthesized ion imprinted polymers and thus suggested the probability of the selective separation for metal ions, such as Pb(II), Cd(II), Li(II), Na(II), Mg(II), Ca(II), Cu(II), Zn(II), and Hg(II) [Rrasado Rao, T., Sobhi Daniel, Mary Gladis, J., Trends in Analytical Chemistry, 23, 28 (2004), Yongwen Liu, Xijun Chang, Sui Wang, Yong Guo, Bingjun Din, Shuangming Meng, Analytica Chimica Acta, 519, 173 (2004)]. Furthermore, by the Fish group of Lawrence Berkely Laboratory in the USA, the selective separation of Zn(II) has been confirmed using the triazacyclononane ligand. Moreover, at Kyushu University and others in Japan, lots of efforts are directed to studying separation properties using metal ion imprinting, and some significant results have been found.

The molecular or ion imprinting techniques are a method of separating a template molecule or ion by imprinting the template molecule or ion, which is to be separated, and then removing it to thus obtain an imprinted site having the ability to recognize the template molecule or ion. The metal ion polymer is synthesized from a monomer capable of binding with a template metal ion. Depending on the type of polymer synthesis method, the form of the MIIP varies. For instance, bulk polymerization is the easiest method. However, this method is disadvantageous because it decreases the uniformity of an imprinted system, reduces the preparation yield of particles, destroys the imprinted site, requires a great amount of cross-linker, and is difficult to apply to chromatography or other industries, attributable to the non-uniform particle size or form. In addition, suspension polymerization or emulsion polymerization may overcome the aforementioned disadvantages of bulk polymerization, but requires a complicated and expensive process with the use of a specific dispersant or emulsifier, and also decreases the binding force of the imprinted polymer, attributable to an undesired interaction between the monomer and the dispersant. In contrast, MIIP, in which polymer beads having a predetermined size serve as a core and the surface of the particles is imprinted, is synthesized, thus making it possible to be efficiently applied to chromatography or other industries. Further, because there is no need for a specific dispersant or emulsifier, MIIP synthesis is advantageous from environmental and economic standpoints, and furthermore, the molecularly imprinted site is present on the surface of the beads, so that rapid diffusion between ligands is induced, resulting in good separation.

SUMMARY OF THE INVENTION

Therefore, the present invention has been devised keeping in mind the above problems occurring in the related art, and provides a method of preparing surface-imprinted microspheres in a core-shell form, which reduces the period of time required to separate heavy metal ions and obviates the use of a surfactant or a stabilizer, and is thus advantageous from environmental and economic standpoints.

According to the present invention, there is provided a method of preparing surface-imprinted microspheres in a core-shell form for selective separation of heavy metal ions, comprising (a) (a1) reacting a molecule composed of a metal salt with a monomer to thus prepare a metal ion-containing monomer, and (a2) mixing the prepared monomer with a cross-linker and a polymerization initiator in a solvent, thus preparing a metal ion-containing monomer mixture; (b) subjecting styrene to dispersion polymerization, thus preparing polystyrene beads, serving as a core; (c) absorbing dibutyl phthalate on the polystyrene beads prepared in (b), and absorbing the metal ion-containing monomer mixture prepared in (a2) on the dibutyl phthalate-containing polystyrene beads, thus obtaining surface-imprinted microspheres in a core-shell form; and (d) removing the metal ion from the microspheres.

In the present invention, the metal salt in (a) is preferably a metal salt comprising a metal selected from the group consisting of Cu, Pb, Cd, Li, Na, Mg, Ca, Zn, Hg, and Fe.

More preferably, the metal salt is $CuCO_3$, $NiCO_3$, or $PbCO_3$.

In the present invention, the monomer in (a) is preferably an acrylate monomer, a styrene monomer, or a silane-based monomer, which contains a carboxyl group.

More particularly, the monomer is selected from the group consisting of acrylic acid, methacrylic acid, ethacrylic acid, vinyl benzoic acid, divinyl benzoic acid, and ethylene glycol dimethyl methacrylate.

In the present invention, the solvent may be selected from the group consisting of water, $C_1$~$C_6$ alcohols, and $C_1$~$C_6$ hydrocarbons.

In the present invention, the polymerization initiator in (a2) is preferably selected from the group consisting of a redox-based initiator and a peroxide-based initiator.

More particularly, the polymerization initiator is azodiisobutyronitrile.

In the present invention, the cross-linker is preferably an acrylate monomer, a styrene monomer, or a silane-based monomer.

More particularly, the cross-linker is ethylene glycol dimethacrylate.

As mentioned above, in the surface-imprinted polyacrylate microspheres in a core-shell form, prepared through the method of the present invention, the imprinted site is present on the surface of a support (e.g., PS beads), thus reducing the time required to separate heavy metal ions and obviating the use of a surfactant or a stabilizer, thereby realizing environmental and economic advantages.

BRIEF DESCRIPTION OF THE DRAWINGS

These, and other features and advantages of the invention, will become clear to those skilled in the art from the following detailed description of the preferred embodiments of the invention rendered in conjunction with the appended drawings.

FIG. 11 shows AFM images of the procedure of adsorption-desorption-readsorption-desorption of $Cu^{2+}$ in MIIP;

DESCRIPTION OF THE PREFERRED EMBODIMENTS

According to the present invention, an MIIP (Metal ion imprinting polymer), the surface of which has a heavy metal ion imprinted site, is prepared using a core-shell polymerization method. To this end, a metal ion-containing monomer is first synthesized. Then, while the monomer thus obtained is cross-linked with a monomer solution, a phase separation procedure is adjusted, thus affording molecularly imprinted microspheres in a monodispersed state at high yield. Because such microspheres are capable of recognizing a metal ion molecule, such as a template molecule, and of strongly binding therewith, they are effective in the separation of specific metal elements.

Hereinafter, a detailed description will be given of the present invention.

The surface-imprinted microspheres induce the rapid diffusion of ligands on the imprinted site in the course of separation because the imprinted site is present close to the surface of beads. When toxic material or heavy metal ions are separated, a core-shell polymerization method is very efficient from environmental and economic standpoints. The core-shell polymerization method includes two steps of preparing seed particles using styrene and DVB (divinylbenzene) and forming the MIIP on the surface of the seed particles. As such, the physical and chemical properties, size, and form of the core-shell polymer particles may vary depending on the reaction conditions or on the structure and composition of the monomer.

Figure 2A:
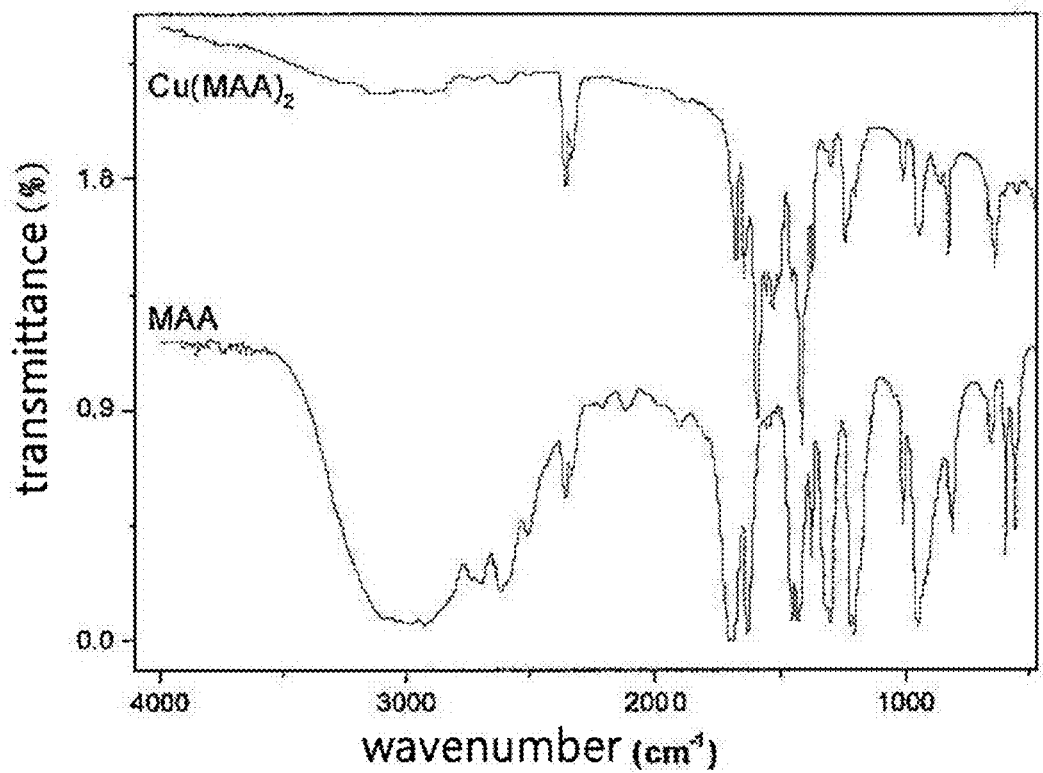
FIGS. 2A and 2B show the IR and UV-Vis spectra of $Cu(MAA)_2$ and MAA, respectively.

FIG. 2A shows the IR peaks of MAA and $Cu(MAA)_2$. The peaks of C=O, C=C, and C—O of MAA were shifted from 1693.4, 1639.4, and 1203.5 cm$^{-1}$ to 1681.8, 1649.1, and 1242.1 cm$^{-1}$, respectively. The —OH peak of COOH in MAA disappeared in $Cu(MAA)_2$, and the (O—Cu) peak appeared at 1591.1 cm$^{-1}$.

Figure 2B:
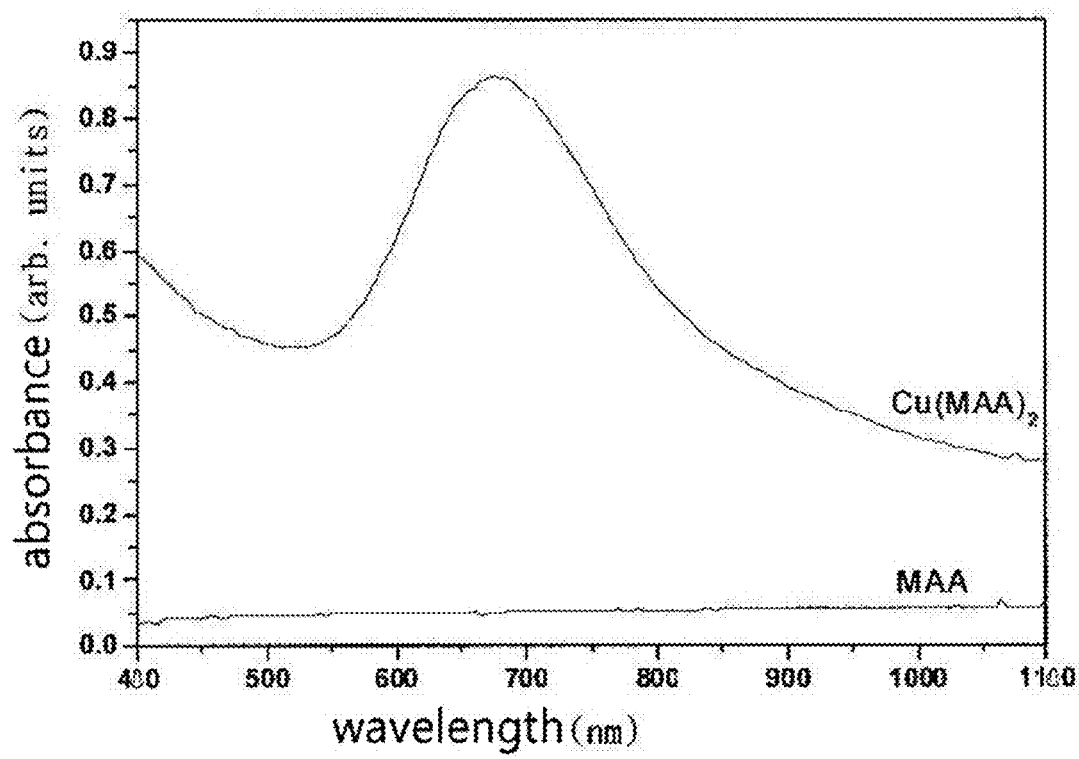

FIG. 2B shows the UV-Visible absorption peaks of MAA and $Cu(MAA)_2$. The peak corresponding to the bond between the copper ion and the COO— group was found at 476 nm.

Figure 2C:
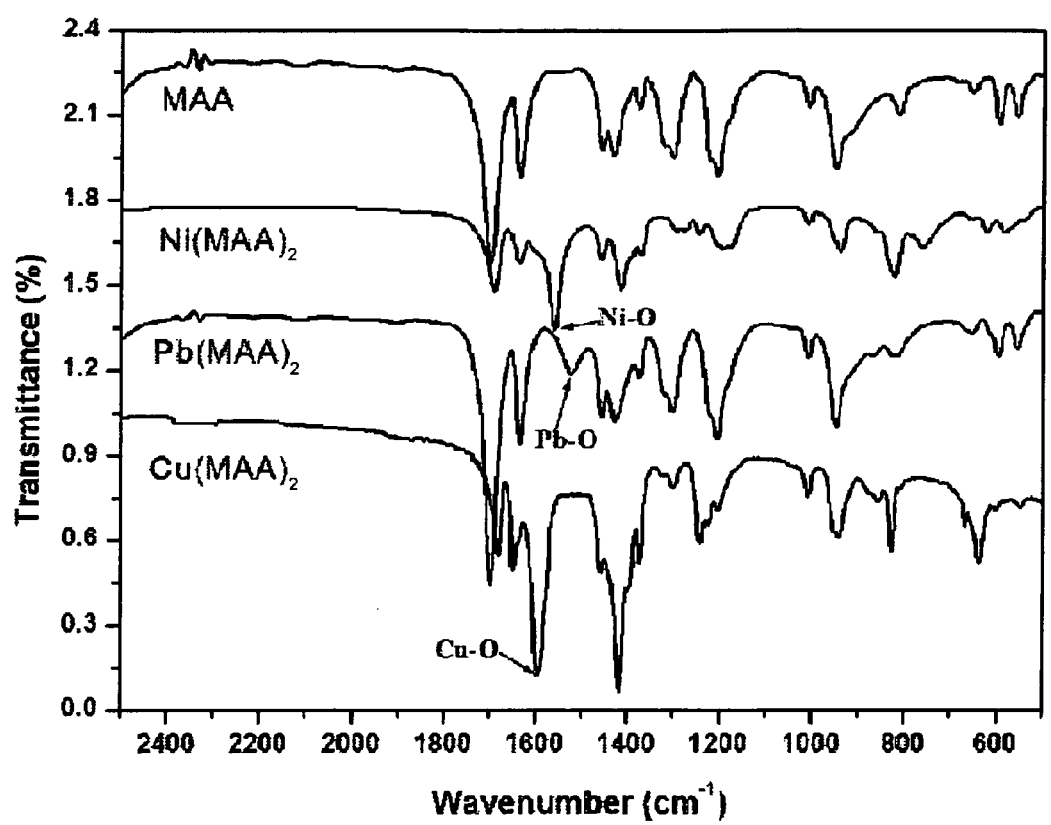
FIG. 2C shows the IR spectra of MAA, $Pb(MAA)_2$, $Ni(MAA)_2$, and $Cu(MAA)_2$.

FIG. 2C shows the IR peaks of MAA, $Cu(MAA)_2$, $Ni(MAA)_2$, and $Pb(MAA)_2$. The —OH peak of COOH in MAA disappeared in $Ni(MAA)_2$ and $Pb(MAA)_2$, and the (O—Ni) and (O—Pb) peaks appeared at 1558.4 cm$^{-1}$ and 1525.6 cm$^{-1}$, respectively.

Figure 3A:
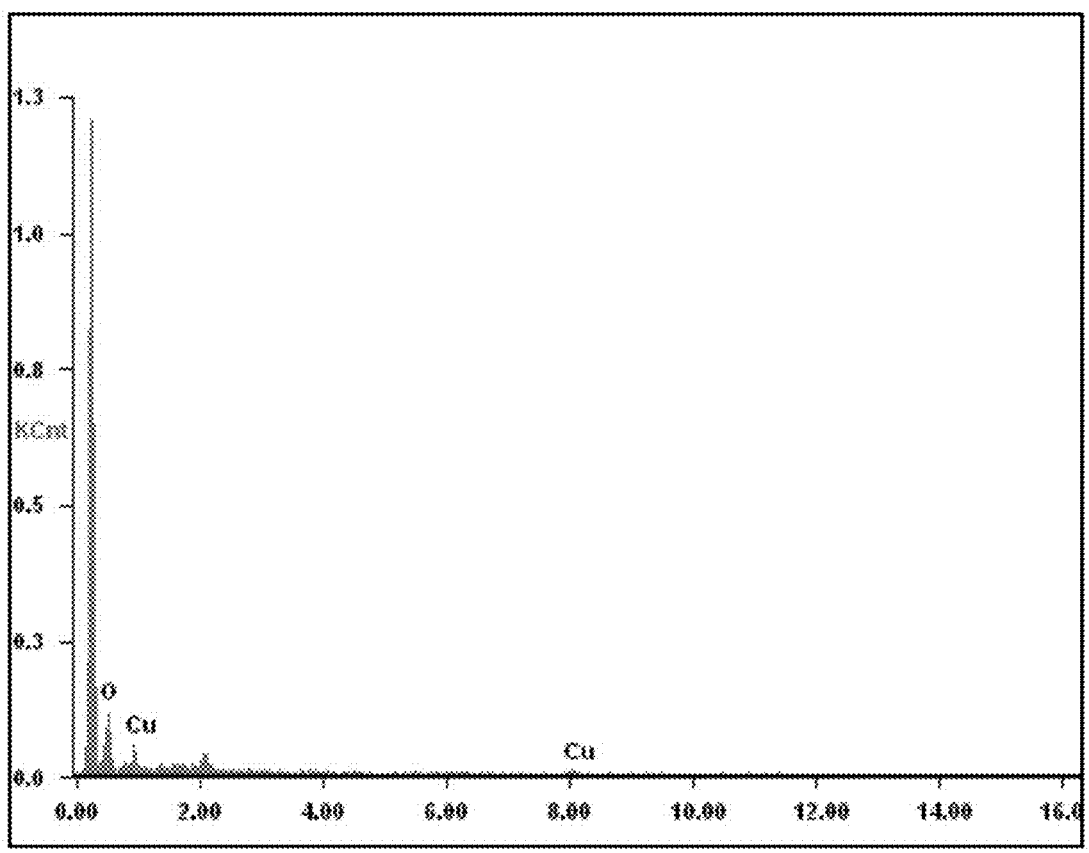
FIGS. 3A, 3B and 3C show the EDAX results of Cu(II)-MIIP, Ni(II)-MIP, and MIIP, respectively.
Figure 3B:
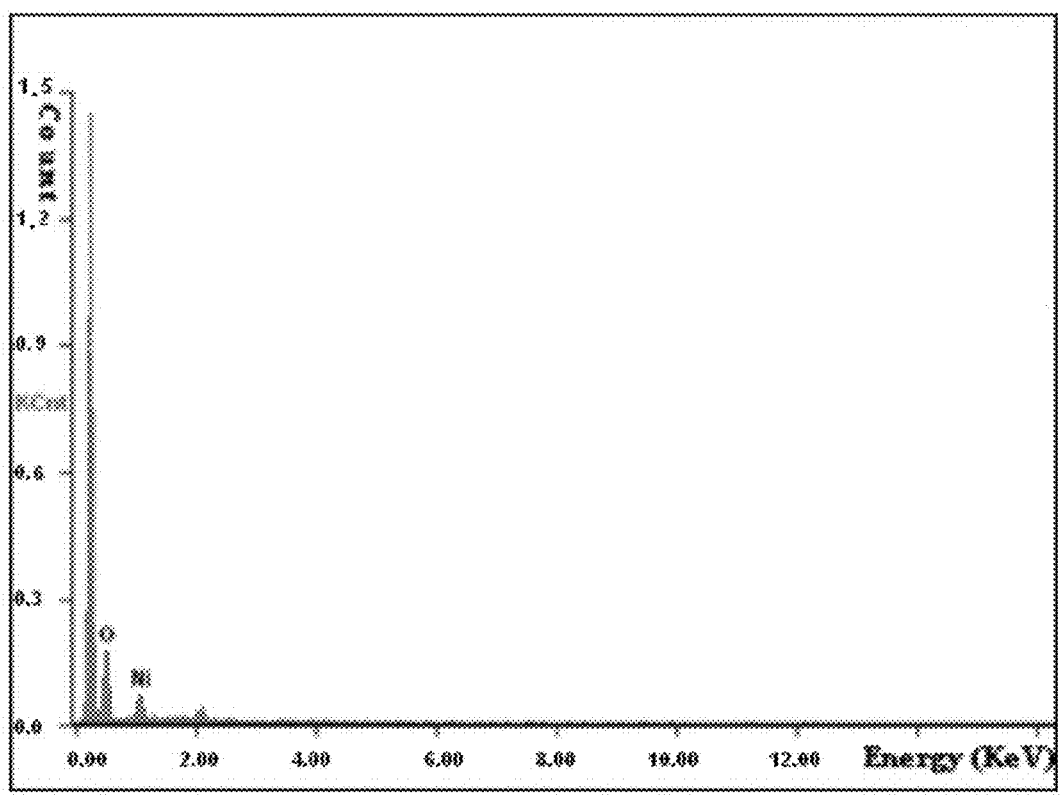
Figure 3C:
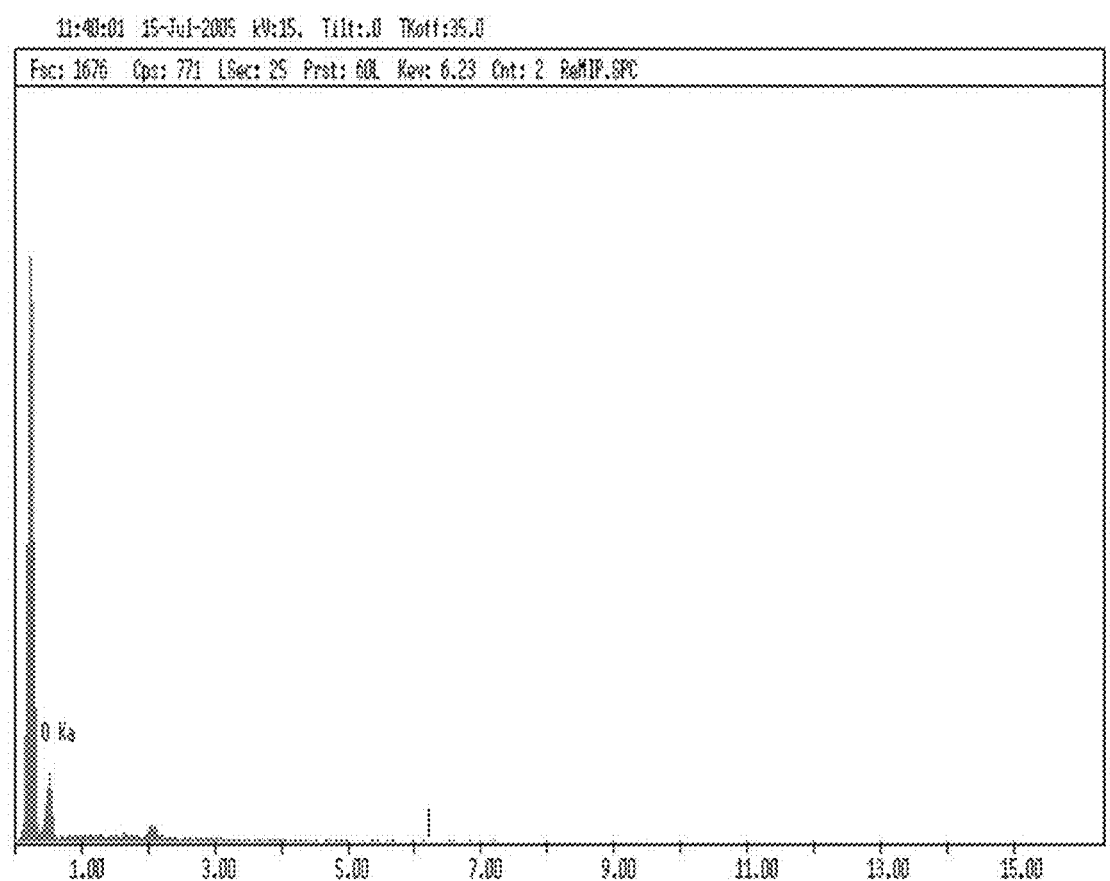

FIGS. 3A to 3C show the EDX graphs of MIIP, in which $Cu^{2+}$ or $Ni^{2+}$ is present, and also from which $Cu^{2+}$ or $Ni^{2+}$ is completely removed. From these drawings, it can be seen that $Cu^{2+}$ or $Ni^{2+}$ is present in the MIIP before the removal thereof and the peak corresponding to $Cu^{2+}$ or $Ni^{2+}$ disappears after the removal thereof.

Figure 4:
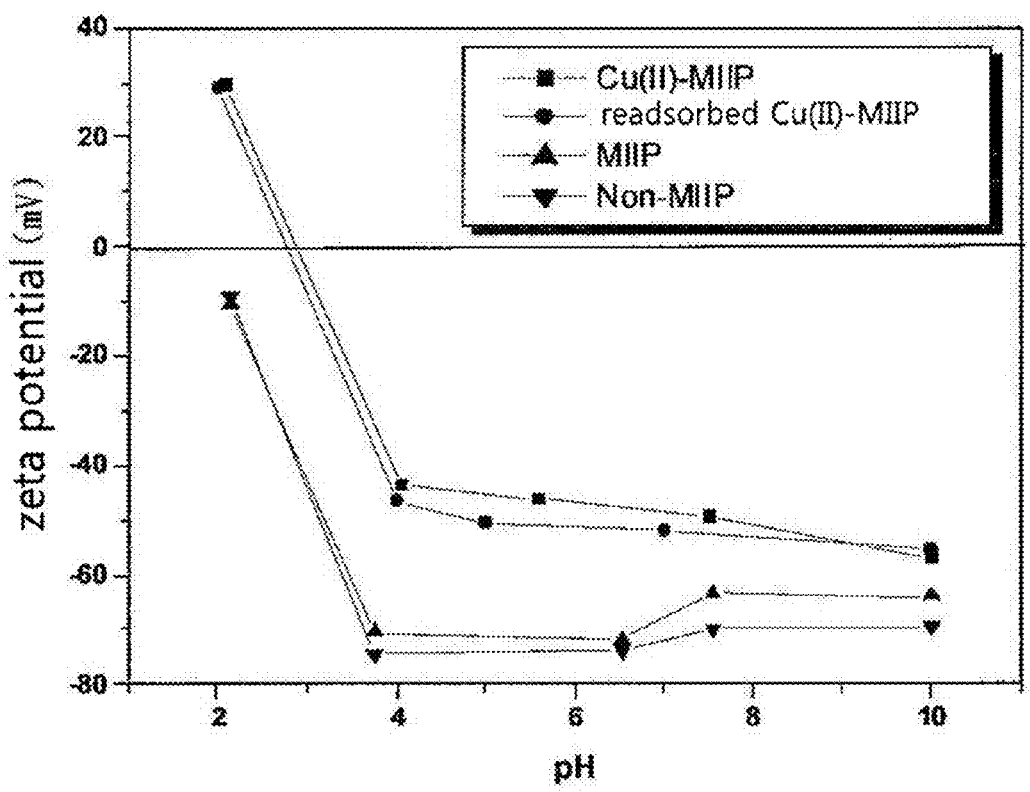
FIG. 4 shows the zeta potential of Cu(II)-MIIP, MIIP, and readsorbed Cu(II)-MIIP as a function of pH.

FIG. 4 shows the zeta potential of the microspheres, which demonstrates the binding force between the copper ion and the COO— group in the imprinted polymer. The electron density of the imprinted polymer particles depends on the pH of the dispersant used. The reason is that the pH affects ionization or protonation. At low pH, Cu(II)-MIIP and readsorbed Cu(II)-MIIP particles, having a high valence cation on the surface thereof, repel the absorption of a cation present in a medium through electrostatic repulsive force. However, MIIP or non-MIIP uniformly lies in the anionic range, regardless of the pH.

Figure 5:
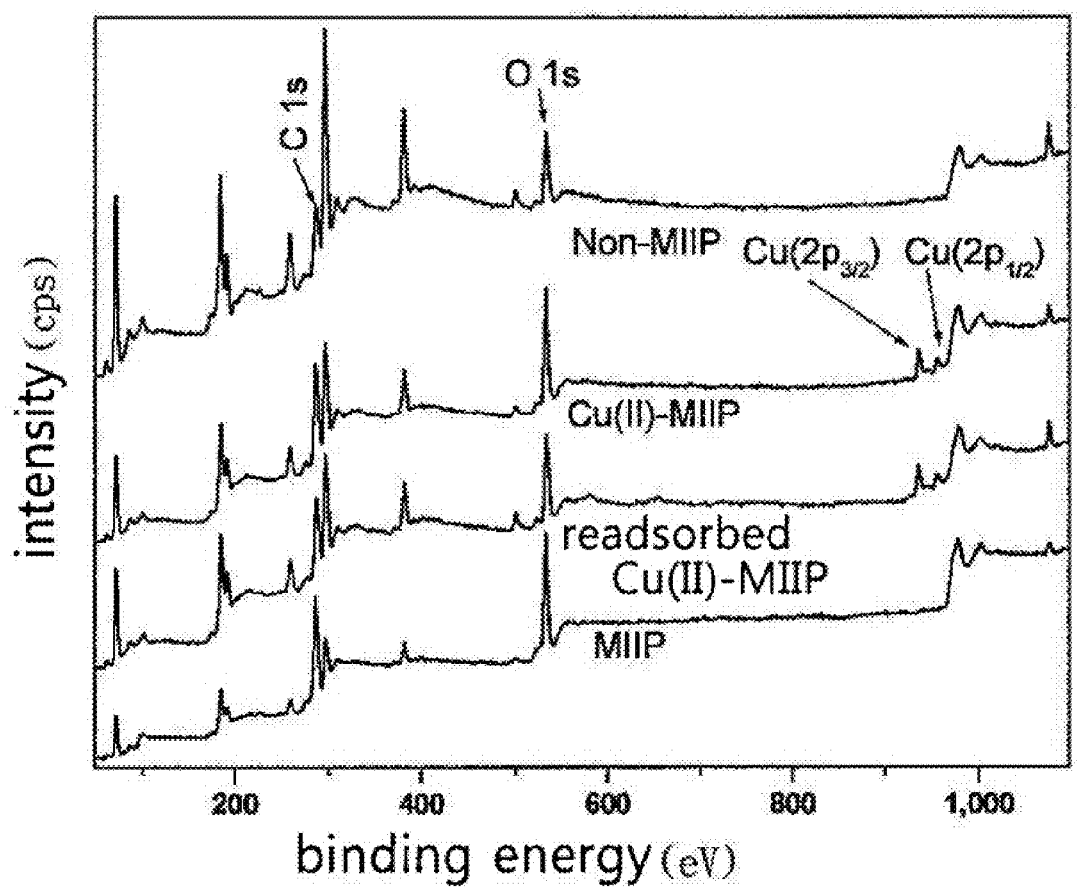
FIG. 5 shows the XPS spectra of polymer microspheres.
Figure 6:
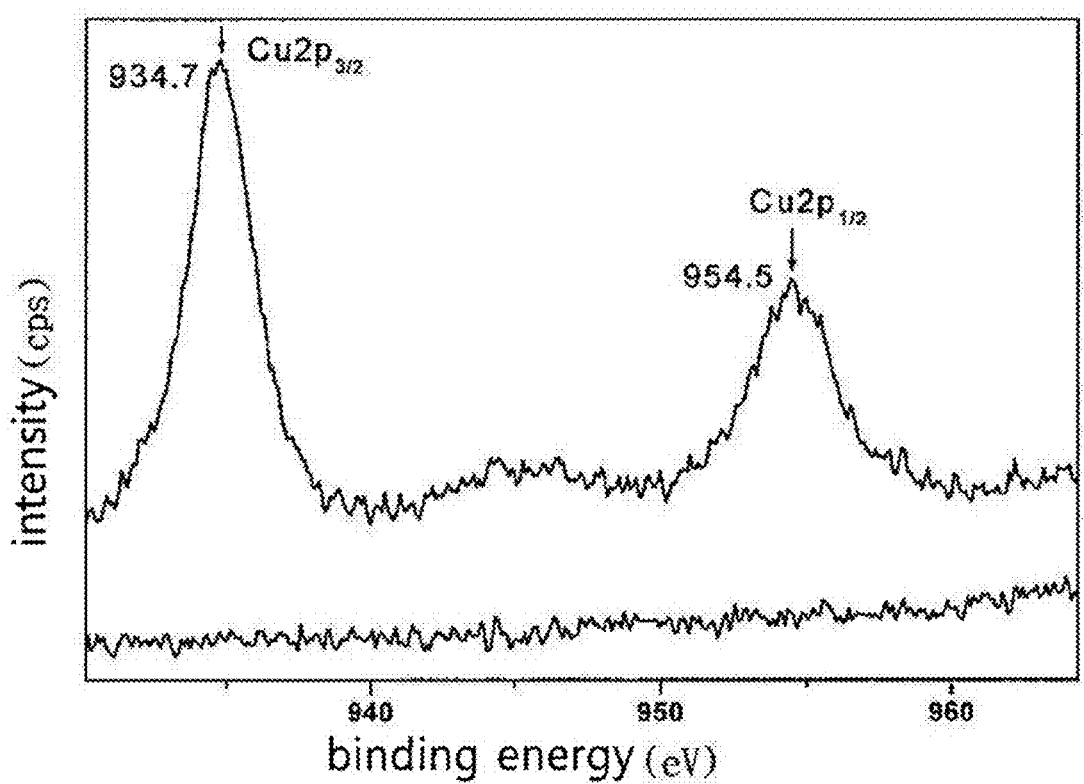
FIG. 6 shows the XPS spectra of the Cu2p peaks of MIIP and readsorbed Cu(II)-MIIP.

FIG. 5 shows the results of XPS analysis of the surface of the polymer particles. The Cu(II)-MIIP and readsorbed Cu(II)-MIIP particles are seen to have a doublet in the vicinity of 934.7 eV ($Cu2p_{3/2}$) and 954.5 eV ($Cu2p_{1/2}$), which indicates that the $Cu^{2+}$ is present in the polymer particles. The disappearance of the Cu2p peak in the MIIP designates the complete removal of the copper ion from the Cu(II)-MIIP.

Figure 7:
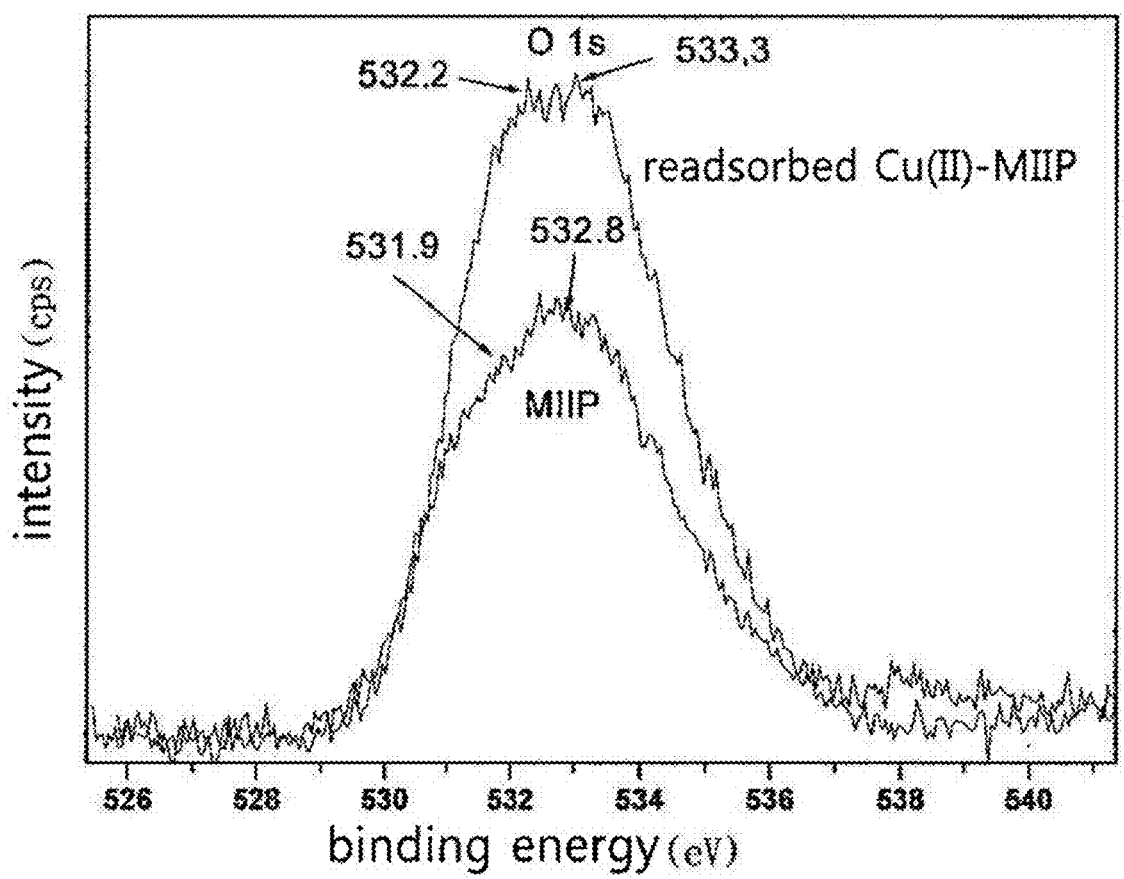
FIG. 7 shows the XPS spectra of the O1s peaks of MIIP and readsorbed Cu(II)-MIIP.

The special attractive force between the carboxyl group and the copper ion may be confirmed by examining O1s spectra. As seen in FIG. 7, the O1s spectrum of MIIP is split into two lines of 531.9 eV and 532.8 eV, corresponding to C=O and C—O, respectively. Because the respective cases have the same number of oxygen atoms, the peak intensities should be the same. However, it is apparent that the C—O peak is higher than the C=O peak. This is because C—O, which is able to bind with the metal ion, is predominantly located closer to the surface than is C=O. The O1s spectrum of the readsorbed C was measured to be 532.2 eV and 533.3 eV, slightly shifted relative to the above positions, which indicates that there is a strong interaction between the carboxyl group and the copper ion.

Figure 8:
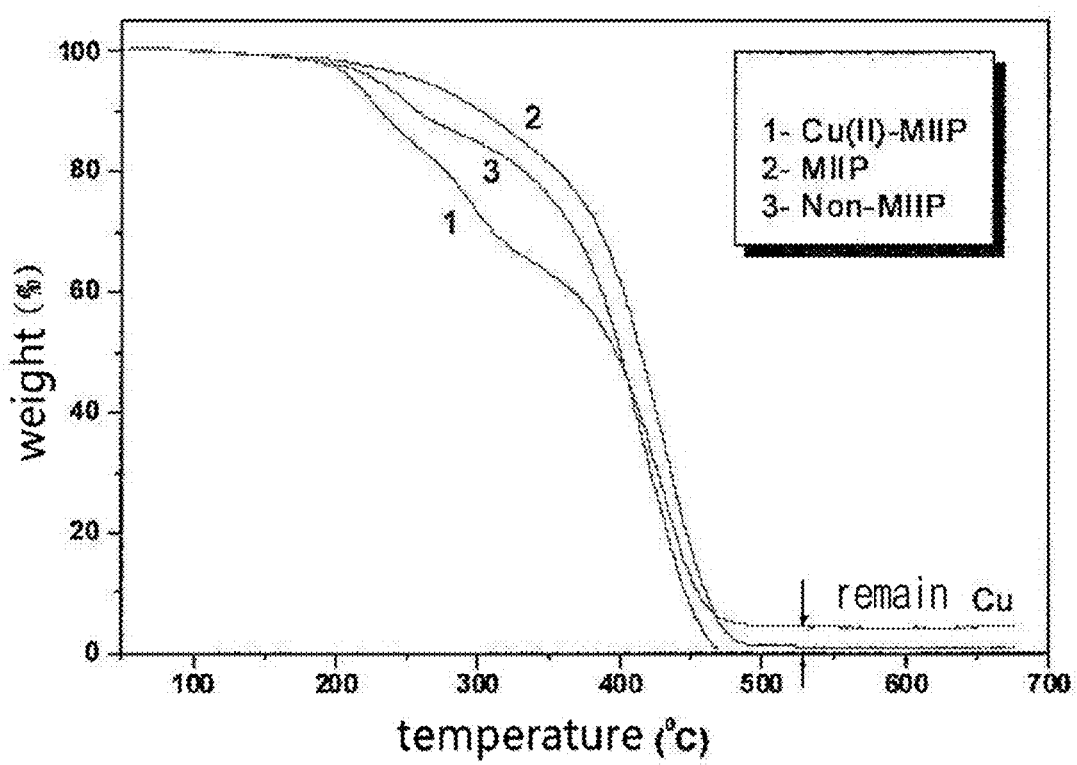
FIG. 8 shows the TGA results of Cu(II)-MIIP, MIIP, and non-MIIP.

FIG. 8 shows the TGA results of Cu(II)-MIIP and MIIP. In the case of MIIP, slight changes are observed due to the evaporation of a solvent (isopropyl alcohol), which is used at the time of synthesizing a polymer, in the temperature range from 210° C. to 350° C. In the case of Cu(II)-MIIP, 0.0101 g of copper ion can be seen to be present per 1 g of particles at 45° C. or higher.

Figure 9:
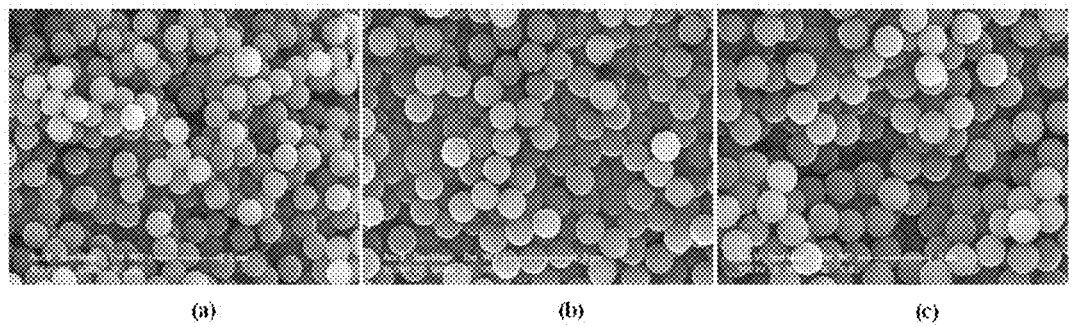
FIG. 9 shows SEM images of PS beads prepared at different ratios of ethyl alcohol to methoxy (ethyl alcohol:methoxy (a) 18:12, (b) 15:15, (c) 12:18)

FIG. 9 shows the microphotographs of the synthesized polystyrene (PS). The PS beads were prepared to have a particle size in a monodispersed state without a tangling phenomenon. The particle size was increased from 2 μm to 2.5 μm in proportion to an increase in the amount of methoxy. The PS prepared at a ratio of ethyl alcohol to methoxy of 12:18 (ml:ml) was used to prepare MIP.

Figure 10:
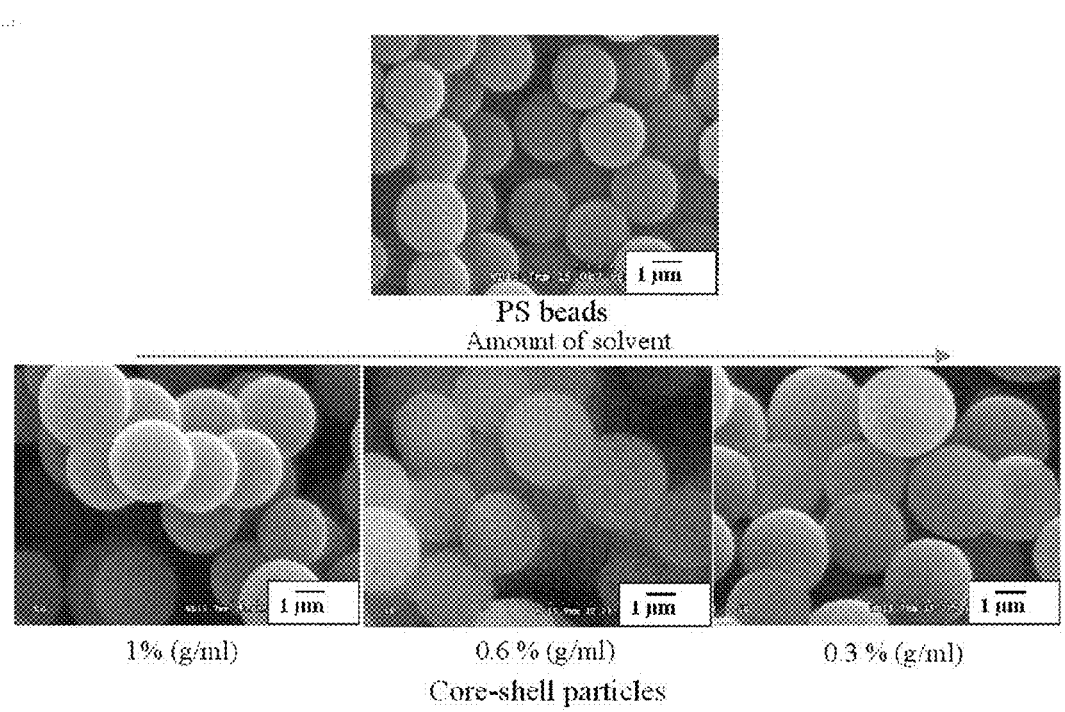
FIG. 10 shows SEM images of core-shell particles composed of PS beads, serving as a core, and MIIP.

FIG. 10 shows the microphotographs of the microspheres prepared at different concentration ratios of monomers (Cu(MAA)$_2$ and EGDMA) in the range from 1 g/ml to 0.3 g/ml. As the concentration of the monomers was increased, the particle size was increased from 3.2 μm to 4 μm.

FIG. 11 is the AFM image showing the surface of Cu(II)-MIIP and MIIP. Whereas an image showing the presence of the copper ion is present in the Cu(II)-MIIP, only pores are present in the MIIP after the removal of the copper ion.

A better understanding of the present invention may be obtained through the following examples, which are set forth to illustrate, but are not to be construed as the limit of the present invention.

EXAMPLES

Example 1

Preparation of Cu(II) Imprinted Polymer in Core-Shell Form

1$^{st}$ Step: Synthesis of Cu(II) Ion-Containing Monomer

Figure 1:
FIG. 1 shows a reaction scheme for the synthesis of a monomer for an imprinted polymer, according to the present invention.

According to the chemical reaction scheme of FIG. 1, copper carbonate (Aldrich, Milwaukee, Wis., USA) was reacted with methyl methacrylate (MAA, Aldrich), thus synthesizing Cu(II) ion-containing copper methacrylate.

To this end, copper carbonate and MAA were stoichiometrically added to dichloromethane, and were then allowed to react at room temperature for two days. The reaction mixture was filtered to thus remove undissolved impurities, after which the dichloromethane solvent was evaporated in a vacuum, thus obtaining solid copper methacrylate. Using FT-IR (IFS-66/s, Bruker, USA), the synthesis of copper methacrylate was confirmed, and was also observed in the UV-Vis range due to the interaction between MAA and Cu(II) (FIG. 2A).

2$^{nd}$ Step: Preparation of Cu(II) Imprinted Polymer in Core-Shell Form

PS seed particles were prepared through dispersion polymerization of styrene.

In a dispersion solvent obtained by mixing predetermined amounts of ethyl alcohol (Aldrich) and methoxyethanol (Aldrich), 0.525 g of PVP was dissolved. Subsequently, 5 ml of styrene, and AIBN (azodiisobutyronitrile, 2% of styrene) were added thereto, after which sonication was conducted to yield a homogenous solvent. Polymerization was conducted for 24 hours using a 50 ml flask at 120 rpm in a water bath at 70° C., thus preparing a latex. The latex thus prepared was washed several times with distilled water and was then separated through centrifugation, thus obtaining PS beads. The PS beads thus obtained were used as a core.

Using a core-shell synthesis method including the following two steps, Cu(II) surface-imprinted polymer particles were synthesized.

Step 1: 25 ml of isopropanol containing 60 wt % PS was added with 0.175 ml of DBP (dibutyl phthalate), sonicated at room temperature for 5 min, and then stirred at room temperature at 400 rpm for 4 hours, so that the DBP was absorbed on the PS beads.

Step 2: A solution of Cu(MAA)$_2$ (0.1 mmol), obtained in the Cu(II) ion-containing monomer synthesis step, EGDMA (1 mmol), AIBN (2% of monomer), and isopropanol was mixed with the solution obtained in the above step 1, after which the mixture thus obtained was stirred at room temperature at 240 rpm for 10 hours so as to absorb the monomer on the DBP-containing PS seed particles. The mixture was heated to 70° C. from room temperature over 2 hours, and was then left to stand at that temperature for 2 hours. The solution of Cu(MAA)$_2$ (0.1 mmol), EGDMA (1 mmol), AIBN (2% of monomer), and isopropanol was added in droplets into a reactor over 3 hours. The synthesis reaction was conducted at 70° C. for 24 hours. After the completion of the reaction, the reaction product was washed several times with ethanol, dried in a vacuum oven at 50° C., and then washed several times. In order to remove the Cu(II) ion from the polymer, the polymer product was immersed in an aqueous HNO$_3$ solution (0.4 M) for 40 min. This procedure was repeated five times so that the Cu(II) ion was completely removed. After the removal of the Cu(II) ion, the polymer particles were washed with deionized water and were then dried in a vacuum oven.

Example 2

Preparation of Ni(II) Imprinted Polymer in Core-Shell Form

1$^{st}$ Step: Synthesis of Ni(II) Ion-Containing Monomer

Nickel (Ni) carbonate (Aldrich, Milwaukee, Wis., USA) was reacted with methyl methacrylate (Aldrich), thus synthesizing Ni(II) ion-containing nickel methacrylate.

To this end, nickel carbonate and MAA were stoichiometrically added to dichloromethane and were then allowed to react at room temperature for two days. The reaction mixture was filtered to thus remove undissolved impurities, after which the dichloromethane solvent was evaporated in a vacuum, thus obtaining solid nickel methacrylate. Using FT-IR (IFS-66/s, Bruker, USA), the synthesis of nickel methacrylate was confirmed (FIG. 2C).

2$^{nd}$ Step: Preparation of Ni(II) Imprinted Polymer in Core-Shell Form

Imprinted polymer particles containing the Ni(II) ion, rather than Cu(II), were prepared. PS seed particles were prepared through the dispersion polymerization of styrene.

In a dispersion solvent obtained by mixing predetermined amounts of ethyl alcohol (Aldrich) and methoxyethanol (Aldrich), 0.525 g of PVP was dissolved. Subsequently, 5 ml of styrene, and AIBN (2% of styrene) were added thereto, after which sonication was conducted to yield a homogenous solvent. Polymerization was conducted for 24 hours using a 50 ml flask at 120 rpm in a water bath at 70° C., thus preparing a latex. The latex thus prepared was washed several times with distilled water and was then separated through centrifugation, thus obtaining PS beads. The PS beads thus obtained were used as a core.

Using a core-shell synthesis method including the following two steps, Ni(II) surface-imprinted polymer particles were synthesized.

Step 1: 25 ml of isopropanol containing 60 wt % PS was added with 0.175 ml of DBP, sonicated at room temperature for 5 min, and then stirred at room temperature at 400 rpm for 4 hours, so that the DBP was absorbed on the PS beads.

Figure 14A:
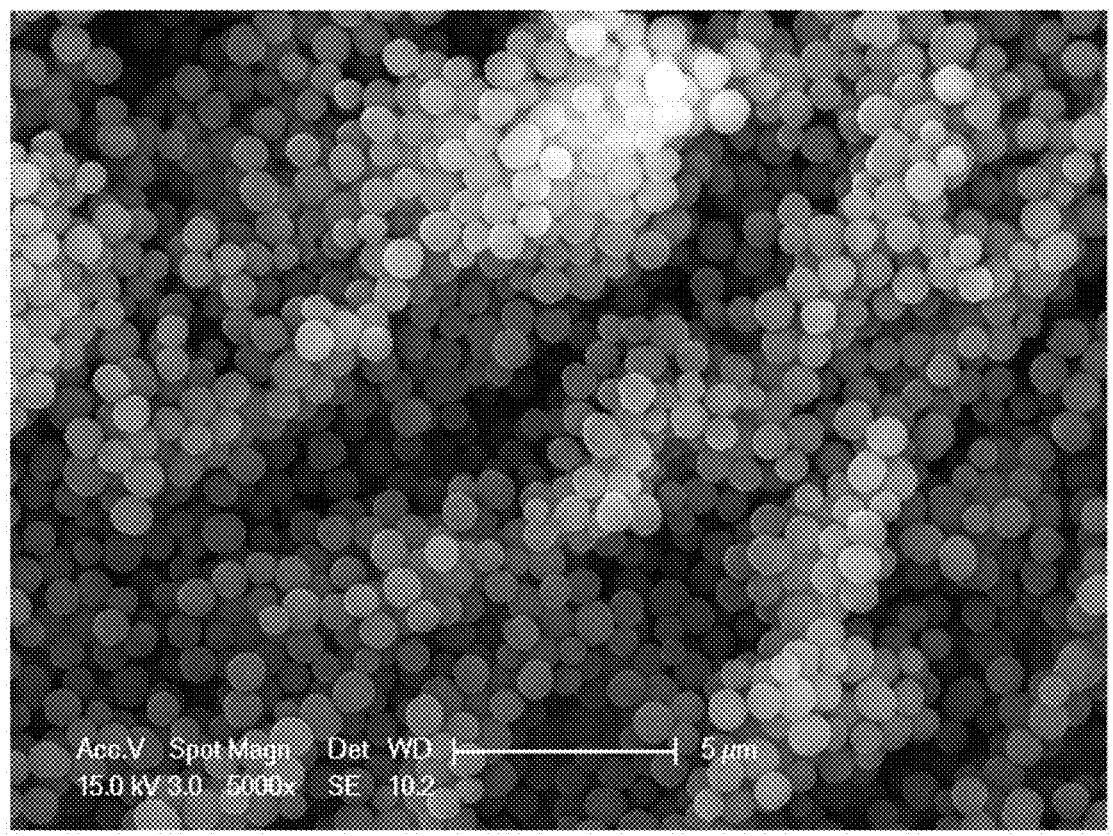
FIGS. 14A and 14B show SEM images of Ni(II)-MIIP microspheres and Pb(II)-MIIP microspheres, respectively.

Step 2: A solution of $Ni(MAA)_2$ (0.1 mmol), obtained in the Ni(II) ion-containing monomer synthesis step, EGDMA (1 mmol), AIBN (2% of monomer), and isopropanol was mixed with the solution obtained in the above step 1, after which the mixture thus obtained was stirred at room temperature at 240 rpm for 10 hours so as to absorb the monomer on the DBP-containing PS seed particles. The mixture was heated to 70° C. from room temperature over 2 hours, and was then left to stand at that temperature for 2 hours. The solution of $Ni(MAA)_2$ (0.1 mmol), EGDMA (1 mmol), AIBN (2% of monomer), and isopropanol was added in droplets into a reactor over 3 hours. The synthesis reaction was conducted at 70° C. for 24 hours. After the completion of the reaction, the reaction product was washed several times with ethanol, dried in a vacuum oven at 50° C., and then washed several times. In order to remove the Ni(II) ion from the polymer, the polymer product was immersed in an aqueous $HNO_3$ solution (0.4 M) for 40 min. This procedure was repeated five times so that the Ni(II) ion was completely removed. After the removal of the Ni(II) ion, the polymer particles were washed with deionized water and were then dried in a vacuum oven. The Ni(II)-MIIP microspheres can be seen through the SEM of FIG. 14A.

Example 3

Preparation of Pb(II) Imprinted Polymer in Core-Shell Form $1^{st}$ Step: Synthesis of Pb(II) Ion-containing Monomer Lead (Pb) carbonate (Aldrich) was reacted with methyl methacrylate (MAA, Aldrich), thus synthesizing Pb(II) ion-containing lead methacrylate.

To this end, lead carbonate and MAA were stoichiometrically added to dichloromethane and were then allowed to react at room temperature for two days. The reaction mixture was filtered to thus remove undissolved impurities, after which the dichloromethane solvent was evaporated in a vacuum, thus obtaining solid lead methacrylate. Using FT-IR (IFS-66/s, Bruker, USA), the synthesis of lead methacrylate was confirmed (FIG. 2C).

$2^{nd}$ Step: Preparation of Pb(II) Imprinted Polymer in Core-Shell Form

Pb(II) ion-containing imprinted polymer particles were prepared. PS seed particles were prepared through the dispersion polymerization of styrene.

In a dispersion solvent obtained by mixing predetermined amounts of ethyl alcohol (Aldrich) and methoxyethanol (Aldrich), 0.525 g of PVP was dissolved. Subsequently, 5 ml of styrene, and AIBN (2% of styrene) were added thereto, after which sonication was performed to yield a homogenous solvent. Polymerization was conducted for 24 hours using a 50 ml flask at 120 rpm in a water bath at 70° C., thus preparing a latex. The latex thus prepared was washed several times with distilled water and was then separated through centrifugation, thus obtaining PS beads. The PS beads thus obtained were used as a core.

Using a core-shell synthesis method including the following two steps, Pb(II) surface-imprinted polymer particles were synthesized.

Step 1: 25 ml of isopropanol containing 60 wt % PS was added with 0.175 ml of DBP, sonicated at room temperature for 5 min, and then stirred at room temperature at 400 rpm for 4 hours, so that the DBP was absorbed on the PS beads.

Figure 14B:
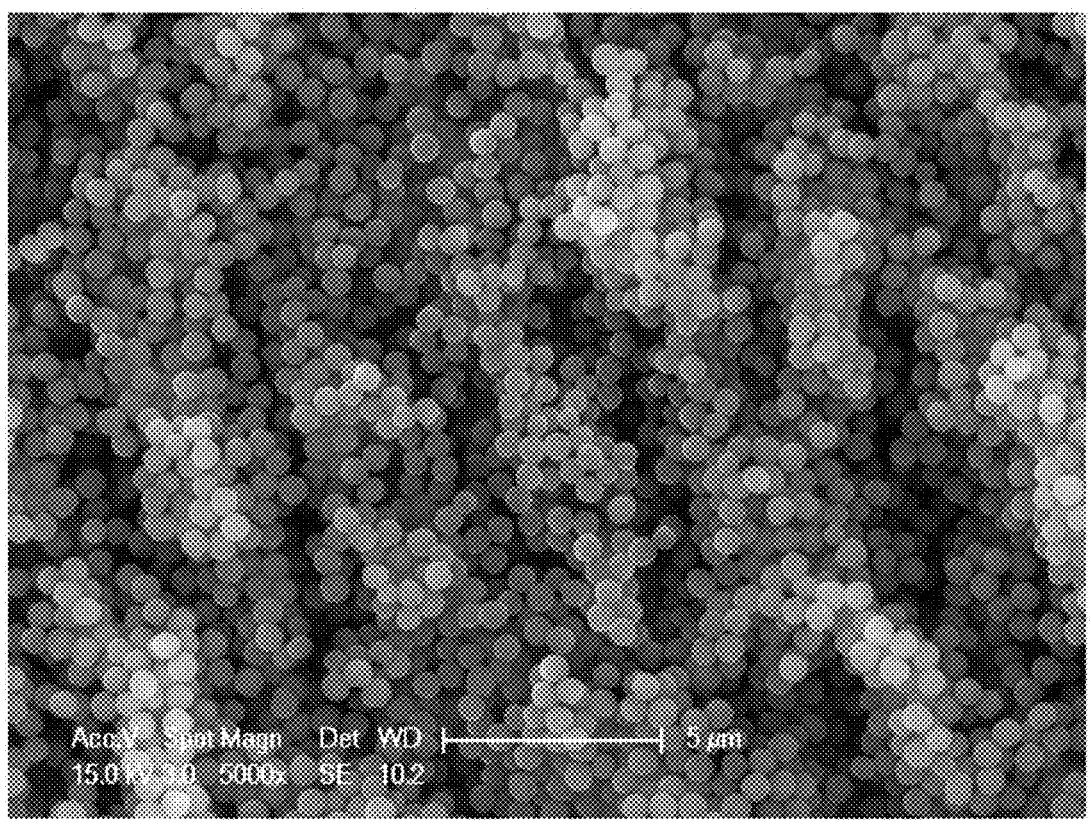

Step 2: A solution of $Pb(MAA)_2$ (0.1 mmol), obtained in the Pb(II) ion-containing monomer synthesis step, EGDMA (1 mmol), AIBN (2% of monomer), and isopropanol was mixed with the solution obtained in the above step 1, after which the mixture thus obtained was stirred at room temperature at 240 rpm for 10 hours so as to absorb the monomer on the DBP-containing PS seed particles. The mixture was heated to 70° C. from room temperature over 2 hours, and was then left to stand at that temperature for 2 hours. The solution of $Pb(MAA)_2$ (0.1 mmol), EGDMA (1 mmol), AIBN (2% of monomer), and isopropanol was added in droplets into a reactor over 3 hours. The synthesis reaction was conducted at 70° C. for 24 hours. After the completion of the reaction, the reaction product was washed several times with ethanol, dried in a vacuum oven at 50° C., and then washed several times. In order to remove the Pb(II) ion from the polymer, the polymer product was immersed in an aqueous $HNO_3$ solution (0.4 M) for 40 min. This procedure was repeated five times so that the Pb(II) ion was completely removed. After the removal of the Pb(II) ion, the polymer particles were washed with deionized water and were then dried in a vacuum oven. The Pb(II)-MIIP microspheres can be seen through the SEM of FIG. 14B.

Test Examples

Test Example 1

Adsorption and Selectivity Experiment (I)

0.1 g of the Cu(II) ion-containing imprinted polymer particles were immersed in 5 $cm^3$ of an aqueous solution containing $Cu(NO_3)_2$, $Ni(NO_3)_2$, and $Cd(NO_3)_2$. The concentration of the respective metal ions was changed from 0.05 mM to 0.5 mM. The pH was adjusted to a desired value between 1.0 and 6.0 by adding a 100 mM acetic/sodium acetate solution and a 100 mM nitric acid solution. The mixture was sonicated for 3 min and was then stirred at room temperature for 5~60 min. The particles were filtered using a polyethylene membrane (Sumplep LCR 25-LG, Nippon Millipore, Ltd., Japan). The metal ion adsorbed on the particles was measured using a Hitachi 180-70 polarized Zeeman atomic absorption spectrophotometer (AAS, Hitachi, Japan). The adsorption capacity (mmol/g) was calculated from the difference between the initial concentration of the metal ion of the solution and the final concentration thereof. The experiment was repeated three times, and the pH was measured using an LI-120 digital pH meter (ELICO, India). The selective separation capability for $Cu^{2+}$ in metals, such as $Mg^{2+}$, $Ni^{2+}$, and $Cd^{2+}$, was measured.

Text Example 2

Adsorption and Selectivity Experiment (II)

0.1 g of imprinted polymer particles containing each of Ni(II) ion and Pb(II) ion were immersed in 5 cm³ of an aqueous solution containing $Cu(NO_3)_2$, $Ni(NO_3)_2$, and $Pb(NO_3)_2$. The concentration of the respective metal ions was changed from 0.05 mM to 0.5 mM. The pH was adjusted to a desired value between 1.0 and 6.0 by adding a 100 mM acetic/sodium acetate solution and a 100 mM nitric acid solution. The mixture was sonicated for 3 min and was then stirred at room temperature for 5~60 min. The particles were filtered using a polyethylene membrane (Sumplep LCR 25-LG, Nippon Millipore, Ltd., Japan). The metal ion adsorbed on the particles was measured using a Hitachi 180-70 polarized Zeeman atomic absorption spectrophotometer (AAS, Hitachi, Japan). The adsorption capacity (mmol/g) was calculated from the difference between the initial concentration of the metal ion of the solution and the final concentration thereof. The experiment was repeated three times, and the pH was measured using an LI-120 digital pH meter (ELICO, India). In the case of the Ni(II)-containing polymer particles, selective separation capability for $Ni^{2+}$ in metals, such as $Cu^{2+}$, $Ni^{2+}$, and $Pb^{2+}$, was measured. Further, in the case of the Pb(II) ion-containing imprinted polymer particles, selective separation capability for $Pb^{2+}$ in metals, such as $Cu^{2+}$, $Ni^{2+}$, and $Pb^{2+}$, was measured.

Test Results

Text Results 1: Adsorption Kinetics and Adsorption Capacity

Figure 12A:
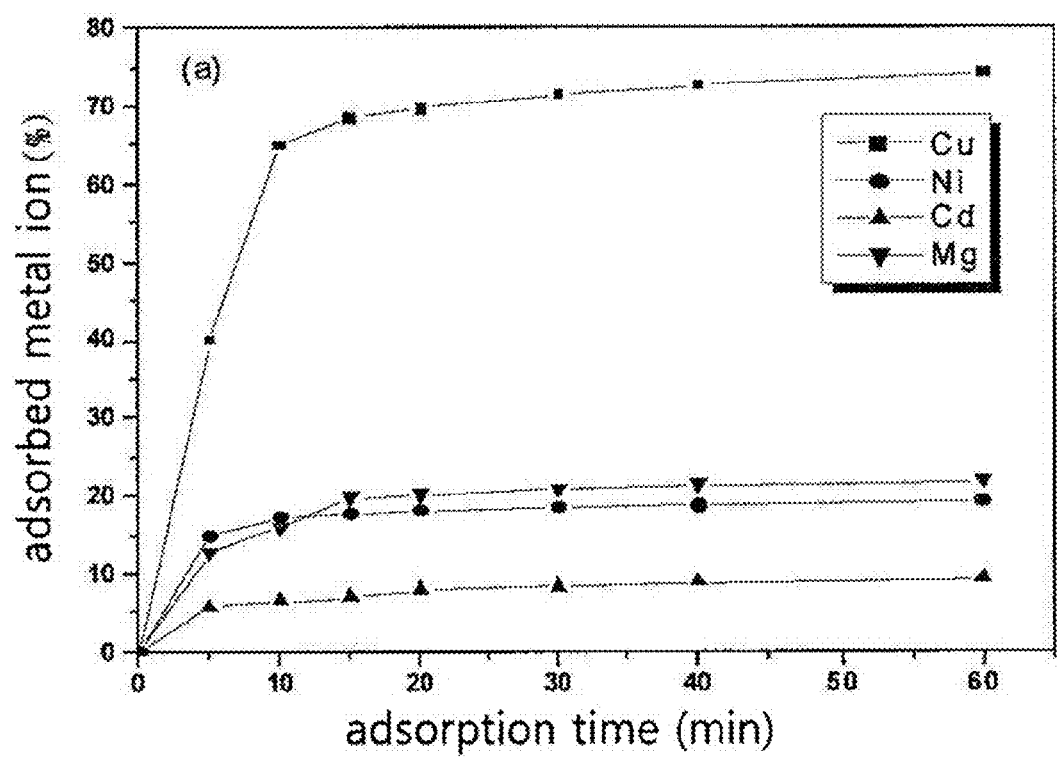
FIGS. 12A and 12B show the adsorption kinetics of metal ions on MIIP and non-MIIP, respectively.
Figure 12B:
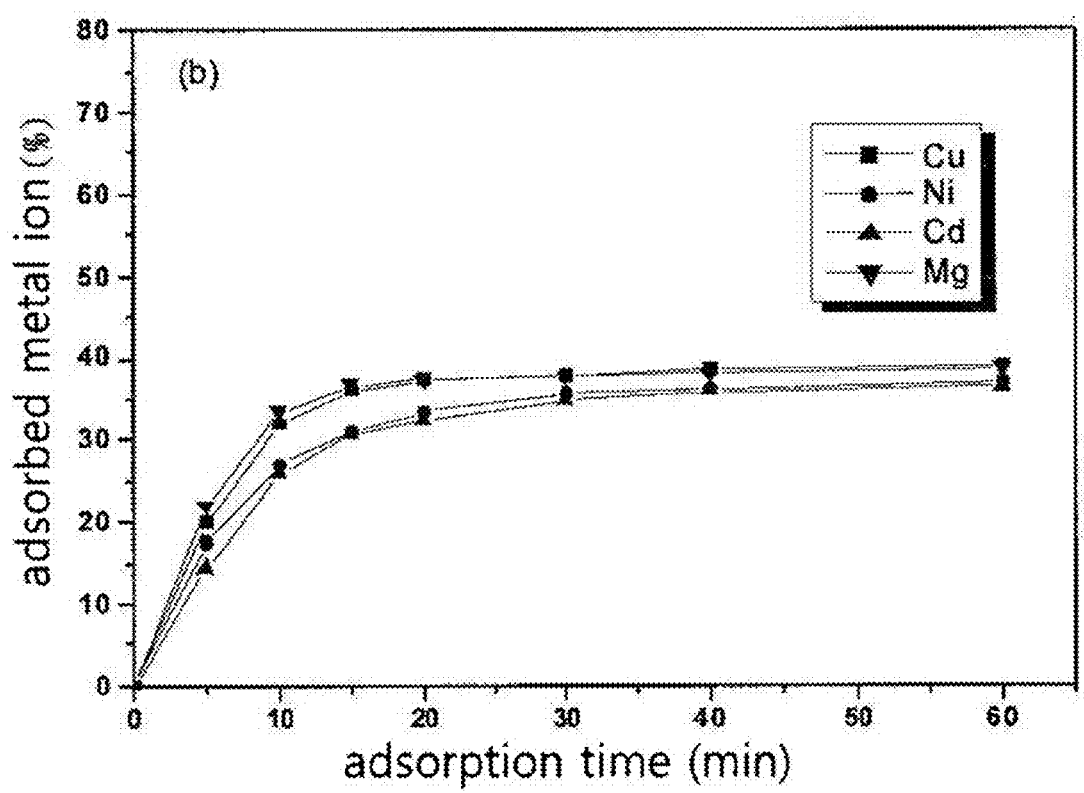

FIGS. 12A and 12B show the adsorption kinetics of the metal ions in MIIP and non-MIIP. Upon early adsorption, high adsorption kinetics were observed, and the adsorption equilibrium was rapidly reached, within 10 min. The maximum adsorption capacity of MIIP for $Cu^{2+}$ was 75%, which was higher than other ions. In the case of non-MIIP, constant values were measured regardless of the types of metal ions. Such rapid adsorption is considered to be due to high ion composite synthesis rate and geometrical affinity between the $Cu^{2+}$ and the $Cu^{2+}$-removed site. It is well known that the removal of the template from the polymer provides the template with the complementary size and form and the chemical functionality. Thereby, the space of a desired form is formed, and accelerates the interaction with the imprinted copper ion. In order to investigate the reusability of the Cu(II) imprinted microspheres, the adsorption-desorption procedure was repeated ten times using the same imprinted polymer. During the repetition of the procedure, no change in adsorption capacity occurred, and therefore, the Cu(II) imprinted microspheres were observed to be reusable.

Test Results 2: Competitive Adsorption

Table 1 below shows the competitive adsorption of the imprinted polymer particles containing the Ni(II) ion or the Pb (II) ion. In the case of Ni(II)-MIIP, $Ni^{2+}$ could be seen to be adsorbed in a relatively larger amount than other ions, for example, $Cu^{2+}$ and $Pb^{2+}$. In the case of Pb(II)-MIIP, $Pb^{2+}$ could be seen to be adsorbed in a relatively larger amount than other ions, for example, $Cu^{2+}$ and $Ni^{2+}$. Likewise, in the case of Cu(II)-MIIP, $Cu^{2+}$ could be seen to be adsorbed in a relatively larger amount than other ions ($Ni^{2+}$ and $Pb^{2+}$)

TABLE 1

Competitive Adsorption of Cu(II)-MIIP, Ni(II)-MIIP, Pb(II)-MIIP

| MIIP Beads | Competitive Adsorption (%) | | |
|---|---|---|---|
| | $Cu^{2+}$ | $Ni^{2+}$ | $Pb^{2+}$ |
| Cu(II)-MIIP | 69.7 | 19.7 | 10.6 |
| Ni(II)-MIIP | 23.9 | 62.9 | 13.2 |
| Pb(II)-MIIP | 23.2 | 21.1 | 55.7 |

Test Results 3: Effect of pH on MIIP Adsorption

Figure 13:
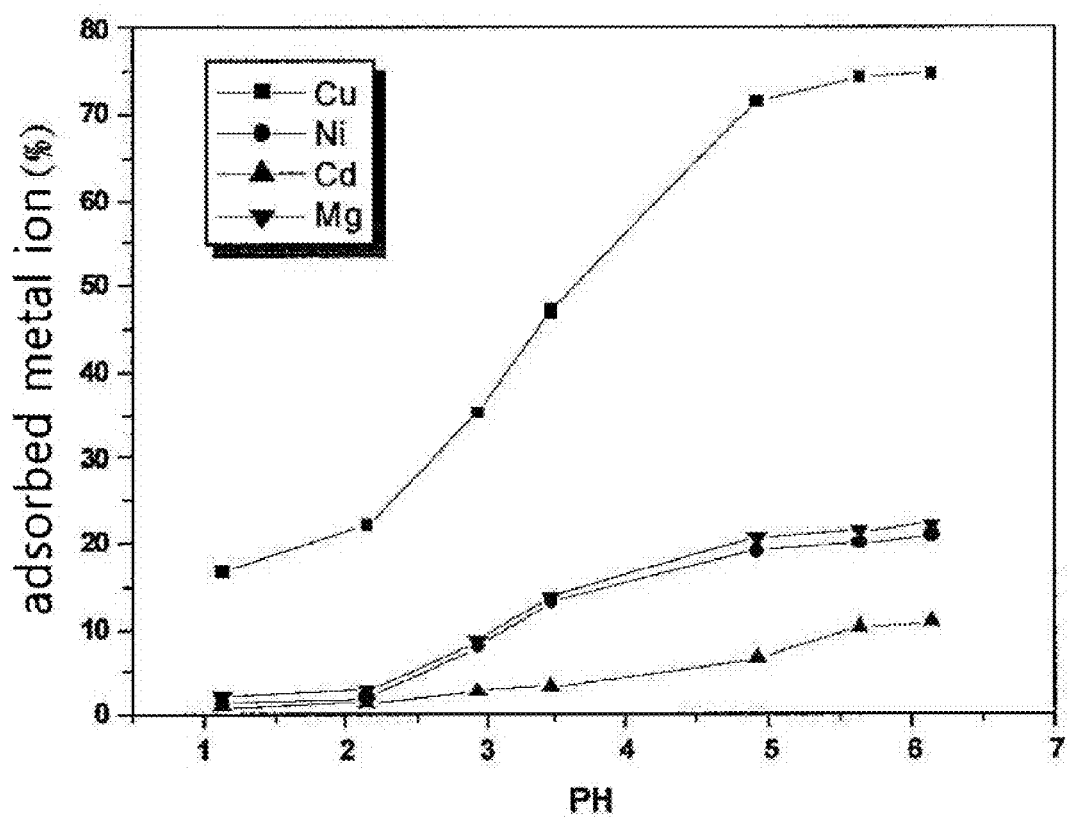
FIG. 13 shows the adsorption capacity of MIIP for metal ions as a function of pH.

High pH increases the ionization of the terminal carboxyl group of a polymer, thus forming a composite of the carboxyl group and the copper ion, adjacent to each other. As seen in FIG. 13, the sorption amount of the metal ion is increased in proportion to an increase in pH, which indicates that the ionization of the carboxyl group present in the terminal end of the host molecule plays an important role in the adsorption of the metal ion. Due to the protonation of the carboxyl group, the sorption capacity is the lowest at pH of 2.0 or less. The Cu(II) imprinted microspheres have higher Cu(II) ion adsorption capacity than other metal ions over the entire pH range.

Test Results 4: Selectivity

The selectivity of the imprinted polymer for $Cu^{2+}$ shows the separation only of $Cu^{2+}$, among various competitive metals. The distribution ratio (D), the selectivity coefficient ($\alpha$), and the relative selectivity coefficient ($\alpha_r$) are defined as Equations 1, 2 and 3, respectively, below.

$$D = \frac{C_A - C_B}{C_A} \times \frac{\upsilon}{m} \qquad \text{Equation 1}$$

wherein $\upsilon$ is the volume (ml) of the solution, m is the mass (g) of the polymer, $C_A$ is the initial metal ion concentration (mmol/l), and $C_B$ is the metal ion concentration (mmol/l) in an equilibrium state.

The selectivity coefficient for the copper ion in the presence of other metal ions is determined from equilibrium binding data.

$$\alpha = \frac{D_{Cu}}{D_M} \qquad \text{Equation 2}$$

wherein $D_{Cu}$ is the distribution ratio of the Cu ion, and $D_M$ is the distribution ratio of other metal ions.

In order to evaluate the imprinting effect, the selectivity coefficients of MIIP and non-MIIP are compared with each other, based on selectivity.

$$\alpha_r = \frac{\alpha_i}{\alpha_n} \qquad \text{Equation 3}$$

wherein $\alpha_i$ and $\alpha_n$ are the selectivity coefficients of MIIP and non-MIIP, respectively.

As is apparent from Table 2 below, the distribution ratio (D) for the Cu(II) ion is much higher than that for other ions. Although Ni(II) and Mg(II) have ionic properties and ion size similar to those Cu(II), the Di thereof is lower than Cu(II), due to the different space configuration in the composite form. Among metal ions other than the template metal ions, Ni(II) and Mg(II) have higher Di than Cd(II). This is considered to be due to the difference in the ion size.

Relative selectivity represents adsorption affinity for the site that recognizes the imprinted copper ion. The competitive adsorption coefficients of Cu(II)/Ni(II), Cu(II)/Cd(II), and Cu(II)/Mg(II) were 11.2, 25.2, and 10.1 times larger in MIIP than in non-MIIP. These results are considered to be because the functional host molecule, having a form adequate for the copper ion, is immobilized on the surface of the MIIP beads and the ion recognition is greatly affected by the metal ion properties, ion size, and ion charge.

TABLE 2

Selective Separation of MIIP and non-MIIP

| Metal Ion | Ion Charge | Ion Radius (pm) | $D_i$ | $D_n$ | $\alpha_i$ | $\alpha_n$ | $\alpha_r$ |
|---|---|---|---|---|---|---|---|
| Cu | 2 | 71 | 143.8 | 32.2 | — | — | — |
| Ni | 2 | 69 | 11.8 | 29.5 | 12.19 | 1.09 | 11.2 |
| Cd | 2 | 92 | 5.1 | 28.7 | 28.2 | 1.12 | 25.2 |
| Mg | 2 | 71 | 14 | 31.6 | 10.27 | 1.02 | 10.1 | wherein $D_i$ is the distribution ratio of MIIP, and $D_n$ is the distribution ratio of non-MIIP.

TABLE 3

| Metal ion | Non-MIIP $D_n$ | Ni(II)-MIIP | | | | Pb(II)-MIIP | | | |
|---|---|---|---|---|---|---|---|---|---|
| | | Di | $\alpha_n$ | $\alpha_i$ | $\alpha_r$ | $D_i$ | $\alpha_n$ | $\alpha_i$ | $\alpha_r$ |
| $Cu^{2+}$ | 35.6 | 17 | 0.79 | 5.95 | 7.5 | 20 | 0.73 | 5.4 | 7.4 |
| $Ni^{2+}$ | 28 | 101.1 | — | — | — | 17.6 | 0.93 | 6.2 | 6.7 |
| $Pb^{2+}$ | 26 | 8.1 | 1.08 | 12.48 | 11.6 | 108.7 | — | — | — |

Selective Separation of non-MIIP, Ni(II)-MIIP, Pb(II)-MIIP for Ions

As described hereinbefore, the present invention provides a method of preparing surface-imprinted polyacrylate microspheres in a core-shell form for the selective separation of heavy metal ions. In the surface-imprinted polyacrylate microspheres in a core-shell form, prepared through the method of the present invention, an imprinted site is present on the surface of a support (e.g., PS beads), thus reducing the time required to separate heavy metal ions and obviating the use of a surfactant or a stabilizer, thereby realizing economic and environmental advantages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing surface-imprinted microspheres having a core-shell form and having imprinted sites that are able to recognize heavy metal ions for selective separation of heavy metal ions, the method comprising the steps of:
   a. reacting a metal salt of a heavy metal with a monomer having at least one group that reacts with the metal salt under conditions effective to prepare a metal ion-containing monomer;
   b. mixing the metal ion-containing monomer with a cross-linker monomer and a polymerization initiator in a solvent to provide a mixture;
   c. subjecting styrene to dispersion polymerization to provide polystyrene beads that serve as a core;
   d. causing absorption of dibutyl phthalate onto the polystyrene beads to provide dibutyl phthalate-containing polystyrene beads;
   e. adding said mixture to the dibutyl phthalate-containing polystyrene beads, causing absorption of the metal ion-containing monomer onto the dibutyl phthalate-containing polystyrene beads, and causing polymerization of the absorbed monomer of the metal ion-containing monomer with the cross-linker monomer to provide the surface-imprinted microspheres having a polymer shell and a polystyrene core; and
   f. causing removal of the metal ions from the surface-imprinted microspheres to provide imprinted sites that are able to recognize said heavy metal ions for selective separation thereof.

2. The method as set forth in claim 1, wherein the metal salt comprises a metal selected from a group consisting of Cu, Pb, Cd, Li, Na, Mg, Ca, Zn, Hg, and Fe.

3. The method as set forth in claim 2, wherein the metal salt is one of $CuCO_3$, $NiCO_3$, and $PbCO_3$.

4. The method as set forth in claim 1, wherein the monomer having at least one group that reacts with the metal salt contains a carboxyl group and is one of an acrylate monomer and a styrene monomer.

5. The method as set forth in claim 4, wherein the monomer having at least one group that reacts with the metal salt contains a carboxyl group and is one of acrylic acid, methacrylic acid, ethacrylic acid, vinyl benzoic acid, and divinyl benzoic acid.

6. The method as set forth in claim 1, wherein the solvent is selected from the group consisting of water, $C_1$~$C_6$ alcohols, and $C_1$~$C_6$ hydrocarbons.

7. The method as set forth in claim 1, wherein the metal ion-containing monomer mixture contains a molar ratio of the cross-linker monomer to the metal ion-containing monomer that ranges from 2:1 to 14:1 and a molar ratio of a total amount of the cross-linker monomer and the metal ion-containing monomer to the solvent is 2~20 wt/vol %.

8. The method as set forth in claim 1, wherein the polymerization initiator is one of a redox-based initiator and a peroxide-based initiator.

9. The method as set forth in claim 8, wherein the polymerization initiator is azodiisobutyronitrile.

10. The method as set forth in claim 1, wherein the cross-linker monomer is one of an acrylate monomer and a styrene monomer.

11. A method of preparing surface-imprinted microspheres having a core-shell form and having imprinted sites that are able to recognize heavy metal ions for selective separation of heavy metal ions, the method comprising the steps of:
   a. reacting a metal salt of a heavy metal with a monomer having at least one group that reacts with the metal salt under conditions effective to prepare a metal ion-containing monomer;
   b. mixing the metal ion-containing monomer with ethylene glycol dimethacrylate as a cross-linker monomer and a polymerization initiator in a solvent to provide a mixture;
   c. subjecting styrene to dispersion polymerization to provide polystyrene beads that serve as a core;
   d. causing absorption of dibutyl phthalate onto the polystyrene heads to provide dibutyl phthalate-containing polystyrene beads;
   e. adding said mixture to the dibutyl phthalate-containing polystyrene beads, causing absorption of the metal ion-containing monomer onto the dibutyl phthalate-containing polystyrene beads, and causing polymerization of the absorbed monomer of the metal ion-containing monomer with the cross-linker monomer to provide the surface-imprinted microspheres having a polymer shell and a polystyrene core; and f. causing removal of the metal ions from the surface-imprinted microspheres to provide imprinted sites that are able to recognize said heavy metal ions for selective separation thereof.

12. A method of preparing surface-imprinted polyacrylate microspheres having a core-shell form and having imprinted sites that are able to recognize copper ions for selective separation of copper, the method comprising the steps of:

a. reacting copper carbonate with methacrylic acid under conditions effective to prepare a copper ion-containing methacrylate monomer;

b. mixing the prepared copper ion-containing methacrylate monomer with a cross-linker monomer that is an ethylene glycol dimethacrylate monomer and a polymerization initiator that is azodiisobutyronitrile in a solvent to provide a mixture;

c. subjecting styrene to dispersion polymerization to provide polystyrene beads that serve as a core;

d. causing absorption of dibutyl phthalate onto the polystyrene beads to provide dibutyl phthalate-containing polystyrene beads;

e. adding said mixture to the dibutyl phthalate-containing polystyrene beads, causing absorption of the copper ion-containing methacrylate monomer onto the dibutyl phthalate-containing polystyrene beads, and causing polymerization of the absorbed methacrylate monomer with the ethylene glycol dimethacrylate monomer to provide the surface-imprinted poylacrylate microspheres having a polyacrylate shell and a polystyrene core; and f. causing removal of the copper ions from the surface-imprinted polyacrylate microspheres to provide imprinted sites that are able to recognize copper ions for selective separation of copper.

13. The method as set forth in claim 1, wherein the metal salt is copper carbonate, wherein the monomer is methacrylic acid, and wherein the metal ion-containing monomer is a copper methacrylate monomer.

14. The method as set forth in claim 1, further comprising, before causing removal of the metal ions from the surface-imprinted microspheres to provide imprinted sites, phase separating the imprinted microspheres to obtain the imprinted microspheres in a monodispersed state.

* * * * *